(12) United States Patent
Throop

(10) Patent No.: US 7,296,058 B2
(45) Date of Patent: Nov. 13, 2007

(54) SYSTEMS AND METHODS FOR MANAGING EMAIL

(75) Inventor: Robert Throop, Lawrence, KS (US)

(73) Assignee: Employers Reinsurance Corporation, Overland Park, KS (US)

( * ) Notice: Subject to any disclaimer, the term of this patent is extended or adjusted under 35 U.S.C. 154(b) by 582 days.

(21) Appl. No.: 10/060,541

(22) Filed: Jan. 30, 2002

(65) Prior Publication Data

US 2003/0145057 A1 Jul. 31, 2003

(51) Int. Cl.
*G06F 15/16* (2006.01)
*G06F 17/30* (2006.01)
*G06Q 40/00* (2006.01)

(52) U.S. Cl. ............................ 709/206; 707/204; 705/4
(58) Field of Classification Search ................ 709/206, 709/224; 707/204; 705/4
See application file for complete search history.

(56) References Cited

U.S. PATENT DOCUMENTS

| | | | |
|---|---|---|---|
| 6,208,426 B1 * | 3/2001 | Saito et al. ................ 358/1.15 |
| 6,321,231 B1 * | 11/2001 | Jebens et al. ............ 707/104.1 |
| 6,678,705 B1 * | 1/2004 | Berchtold et al. .......... 707/204 |
| 6,704,118 B1 * | 3/2004 | Hull et al. ................. 358/1.15 |
| 6,853,749 B2 * | 2/2005 | Watanabe et al. ........... 382/177 |
| 7,032,030 B1 * | 4/2006 | Codignotto ................. 709/246 |
| 7,092,509 B1 * | 8/2006 | Mears et al. ........... 379/266.01 |
| 7,092,945 B2 * | 8/2006 | Hall et al. ..................... 707/10 |
| 7,103,602 B2 * | 9/2006 | Black et al. ................ 707/101 |
| 7,155,481 B2 * | 12/2006 | Prahlad et al. .............. 709/206 |
| 2001/0049611 A1 * | 12/2001 | Peach ............................ 705/4 |
| 2002/0007289 A1 * | 1/2002 | Malin et al. ................... 705/4 |
| 2002/0059317 A1 * | 5/2002 | Black et al. ................ 707/200 |

* cited by examiner

Primary Examiner—Andrew Caldwell
Assistant Examiner—Douglas Blair
(74) Attorney, Agent, or Firm—Armstrong Teasdale LLP

(57) ABSTRACT

The invention provides for systematic email induction. Email is automatically scanned for email content. The content is then extracted and automatically loaded to a graphics database accessible from a network. The graphics database may for example be a FileNet repository. "Content" may include the written text of the email, graphic image attachments, electronic documents, and other file types. Preferably, content is associated with certain business tasks to facilitate future use of the content within automated workflow processes. Content is preferably stored within the graphics database as one or more single page TIFF files to memorialize the content for later use with the workflow processes.

45 Claims, 5 Drawing Sheets

SYSTEMS AND METHODS FOR MANAGING EMAIL

BACKGROUND OF THE INVENTION

The use of email is used extensively in communications. Users of email generally receive several messages each day on a desktop or laptop computer. Each message may contain written text and often contains one or more enclosures such as electronic text documents and graphic images, including facsimile images.

The prior art includes server and software systems that facilitate the delivery and sending of email to and from email users. In one system, for example, a server couples between the Internet and a local area network of a corporation; multiple computers of corporate employees couple with the local area network to communicate with the server to send and receive email. One well-known server of the prior art is the MICROSOFT EXCHANGE® server. One well-known software system operable on individual computers is MICROSOFT OUTLOOK®. Collectively, corporate email users with MICROSOFT OUTLOOK® and connected with the local area network may communicate with the MICROSOFT EXCHANGE® server to send and receive email through the Internet, as known in the art.

The management of email may be critical to a corporate business. To manage email, the corporation or its email users sometimes save email within electronic storage memory, e.g., internal memory or a server. Often, however, electronically stored email messages become a voluminous congregation of email messages that is too unwieldy to utilize effectively. Email is also sometimes printed onto paper for manual storage; such printing may include printing of the email message, i.e., its written text, and any enclosure. Similar to electronic storage, however, manual storage of email text and enclosures is equally difficult to manage, over time. A corporation may need to store thousands of emails each week, requiring a dedicated staff to store the email within file cabinets so that the written text and enclosures (e.g., graphic images) of the email are stored and recorded for use at a later date.

Another problem of the prior art is that email text and attachments may be corrupted, modified or deleted when stored in native electronic form. By way of example, modification or corruption may occur when subsequent users of stored email open attachments to make changes or comments. There is therefore the risk that if the email text and/or attachment are required at a future date, they may not be available as originally received, if at all. Companies utilizing email communication systems often implement manual processes, such as drafting and mailing a letter, and/or physically printing and scanning attachments into a graphic form via a scanner, in order to memorialize data.

The invention seeks to advance the state of the art in email and software systems by providing methods and systems for automatically managing email so as to securely memorialize email for future workflow. Several other features of the invention are apparent within the description that follows.

SUMMARY OF THE INVENTION

As used herein, email "content" means email written text and/or email enclosures. Email enclosures are also identified herein as email "attachments."

The invention of one aspect is a method for systematic email induction. The method includes the steps of electronically monitoring email for email content, automatically extracting the content, and loading the content to a graphics database accessible from a network. The step of extracting may include extracting graphic image attachments, documents and/or parsed text from the email. The step of loading the content may include releasing the content into a graphics database such as a FileNET repository.

In one aspect, content images stored in the database are associated with tasks to facilitate workflow processes. By way of example, content images may be tagged with information identifying or relating to a particular business task so that the images are subsequently located within the database for use with the task. In another example, workflow processes are triggered by loading content into the graphics database. A database such as a FileNET repository may for example be configured to automatically respond to the loading of new content by an acknowledgement (e.g., a log file or image identifier); the acknowledgment of one aspect is used to trigger automated workflow processes.

In another aspect, one method of the invention includes the step of periodically polling an email inbox for new messages. By way of example, the email inbox may be provided by MICROSOFT OUTLOOK® software on a computer. Polling may occur at a desired frequency such as every ten seconds, although shorter or longer durations may be used as a matter of design choice. Polling of email inboxes may also occur over a company's network, such as with use of a MICROSOFT EXCHANGE® server.

In still another aspect, one method of the invention includes the step of automatically determining an organization associated with the email. The organization may be compared with an authorization list prior to proceeding with automated processing of the email. If the organization is not authorized, the email is forwarded to secondary storage for manual handling. By way of example, when a new message is discovered in the inbox, application software determines which sender (e.g., an organization) sent the message by interrogating the "From:" portion of the heading. The application then makes a table comparison to assure that the sender is authorized to have its email processed. If the sender is not authorized, the application notifies a system administrator of the error via email while moving the message from the Inbox to an electronic "Errors" folder. The administrator has the option of either adding the sender to the table or rejecting the transaction. If the administrator determines that the email should be processed, she can make a table entry adding the email address of the sender so that the email is processed accordingly.

In another aspect, one method of the invention includes the step of automatically scanning the email for illegal text strings defined in a predetermined electronic file. By way of example, application software of the invention explores the text of the message for illegal text strings as prescribed in the electronic file (e.g., a table). If an illegal string is detected, the application software moves the message to the Errors folder under the Inbox and notifies the administrator via email. The administrator may dispose of the message or forward it unprocessed to another person, as appropriate.

Moreover, in another aspect, information parsed from email text may be translated to desired or standardized text. If for example an organization is identified in several ways, parsed text of the organization may be translated to a selected standardization of that name according to user preferences.

In other aspects, certain methods of the invention may include the step of converting the email, without enclosures, to a graphics image, e.g., a TIFF image. Email enclosures may also be converted, as necessary, to graphic images. By way of example, the application software may convert the actual email message into a TIFF image and investigate the enclosures to determine the quantity and type of the enclosures. If the enclosures are not in TIFF format, for example if the enclosures include a text document or spreadsheet, the application software converts the non-graphic enclosures to a TIFF format. Preferably, the application software converts all attachments to single-page TIFF format.

In one aspect, the method includes the step of automatically formulating an overview file summarizing the content stored in the graphics database. By way of example, the application software may assemble collected content and create a file that reflects the contents of the email message; this file may for example facilitate use of the FileNET repository such as set forth by FileNET High Performance Image Import (HPII) known in the art. The application software copies the files it has created to the HPII/Parent directory on the graphics database that hosts the FileNET system. The application software keeps track of all files written and continuously polls the HPII/Parent directory looking for names within .rpt files that correspond with the names of previously written .eob files. Once any particular .rpt file is located, the document id (e.g., created by FileNET in response to image acceptance) is retrieved and coupled to the message id (e.g., created by MICROSOFT EXCHANGE®) as well as the batch id created by the application software and stored in an access file or table. In another example, FileNET Panagon may be used to assist in the induction of email content to a FileNET repository. Acknowledgments from the graphics database may be used to trigger automated workflow processes.

In still another aspect, the invention provides an email system for managing email content of a network. The system includes application software on an email induction server and an email server configured to monitor incoming email of the network. The application software extracts content from the email and converts the content to a graphics image; it thereafter loads converted email content to a graphics database accessible from the network. In one aspect, the graphics database acknowledges receipt of loaded content to trigger automated workflow processes.

In yet another aspect, an improvement to an email system is provided. The email system is of the type that processes email for a network. The improvement includes application software configured with the network to convert content of the email to graphic images and to store the graphic images into a graphics database accessible from the network. In one aspect, the database automatically responds to the storing of graphic images to trigger subsequent workflow processes linked with the content.

The invention thus has certain advantages. By way of example, systems and methods of the invention may provide for memorializing email content to ensure future uncorrupted use of the content. Moreover, storage of the content as graphic images can automatically and securely trigger automated workflow processes. In one example, when the email includes an insurance claim, the email claim is secured in graphic form for future reference to trigger workflow processes. Such a process may include the steps of: communicating email (e.g., an insurance claim) from a computer to an email server, converting content of the email to one or more graphic images for storage within a graphics database in response to receiving the email at the server, and automatically communicating acknowledgment to the server that the content is graphically memorialized. The process may further provide for triggering workflow (e.g., further processing of the insurance claim) associated with the email in response to the acknowledgment. Accordingly, future workflow processes may acquire images of the content through access of the database through a network.

The invention also provides other advantages apparent in the description herein. One advantage for example provides for graphically storing email written text and enclosures for automated workflow processes. By managing email in accord with the principles disclosed herein, the invention further provides means for accepting, processing and delivering email content that drives workflow without human intervention.

The invention is next described further in connection with certain embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
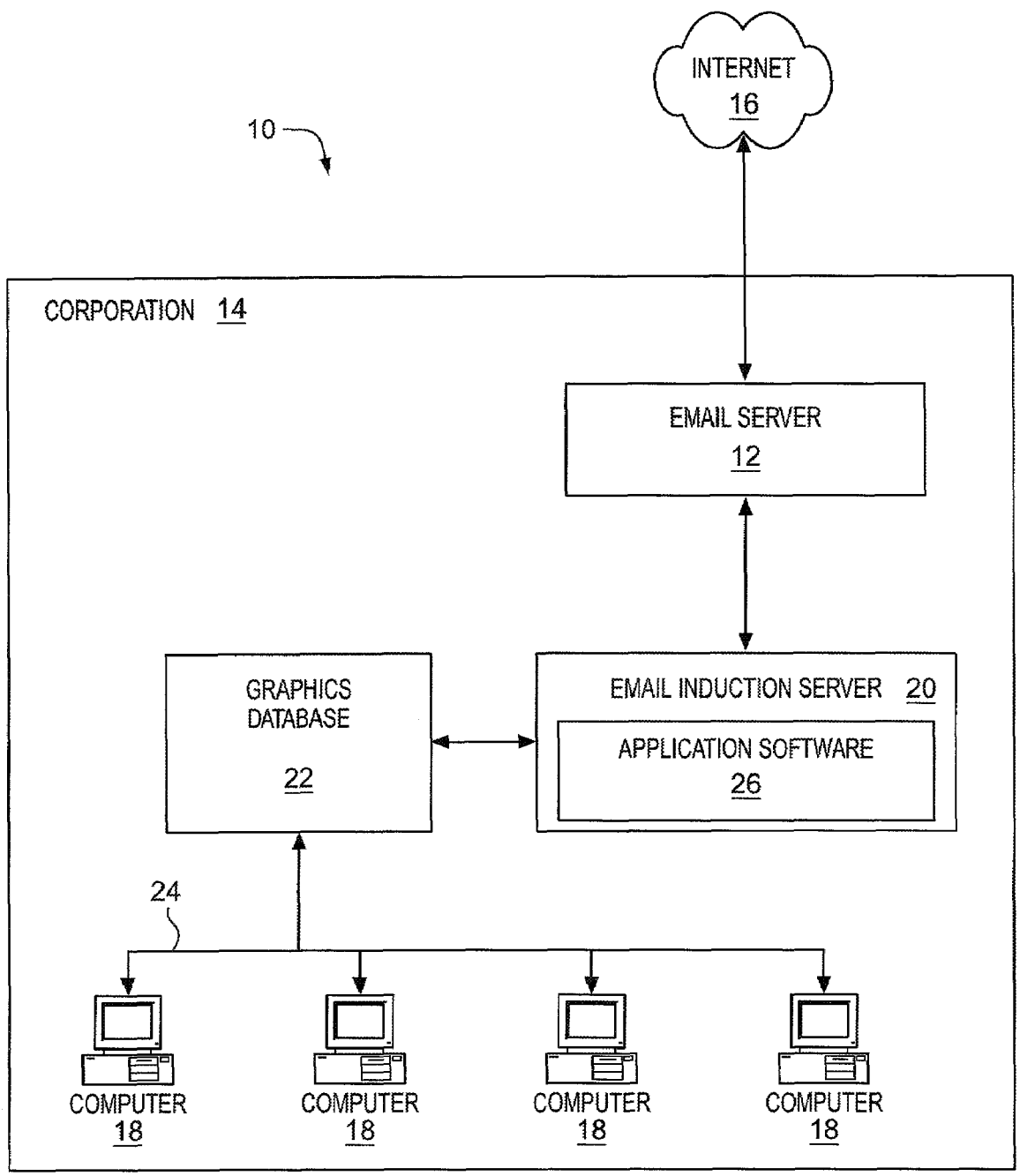
FIG. 1 shows a schematic block diagram of one email management system of the invention.

FIG. 1 shows an email induction system 10 of the invention. An email server 12 of a corporation 14 connects to the Internet 16 to facilitate email communications between Internet 16 and individual computers 18 within corporation 14. An email induction server 20 and a graphics database 22 couples between computers 18 and server 12, as shown. Each computer 18 connects to a local area network 24 to provide email communications to and from servers 12 and 20, database 22, Internet 16, and to other computers 18.

Server 20 has application software 26 that automatically scans, extracts and graphically converts content from email according to the teachings herein, e.g., such as described in connection with FIG. 2, FIG. 2A, and FIG. 2B. Graphical content from server 20 is loaded into a graphics database 22 to facilitate workflow processes. Graphics database 22 is for example a FileNET repository. Preferably, email content is stored within database 22 according to business tasks associated with the content so that corporate users may access images defining the content on demand. Application software 26 may be accessed and managed through a computer 18 connected with server 20.

Each computer 18 generally includes an email software interface such as MICROSOFT OUTLOOK®. Server 12 may for example be a MICROSOFT EXCHANGE® server. Application software 26 may poll incoming email to any email inbox of email server 12 to acquire and store content as graphic files within database 22 accessible by computers 18. Server 20 may for example be a MICROSOFT NT® application server used to run application software 26. As known in the art, servers 12, 20, database 22 and computers 18 may have installed client software to facilitate communications with other devices and systems. For example, when database 22 is a FileNET repository, computers 18 and server 20 have appropriate FileNET client software installed.

Figure 2:
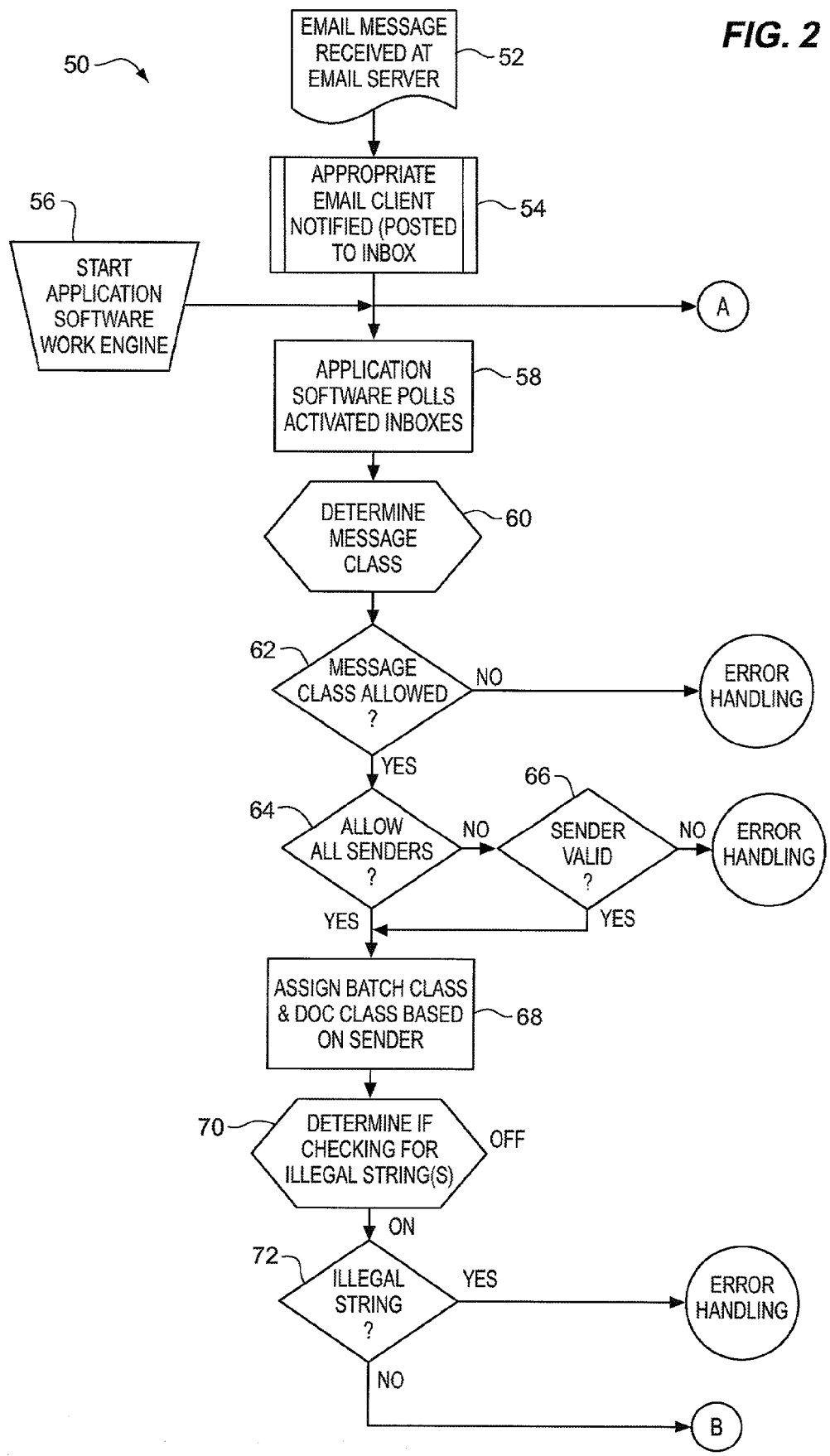
FIG. 2 and FIG. 2A show a flowchart illustrating application steps for email induction in accord with one embodiment of the invention.
Figure 2A:
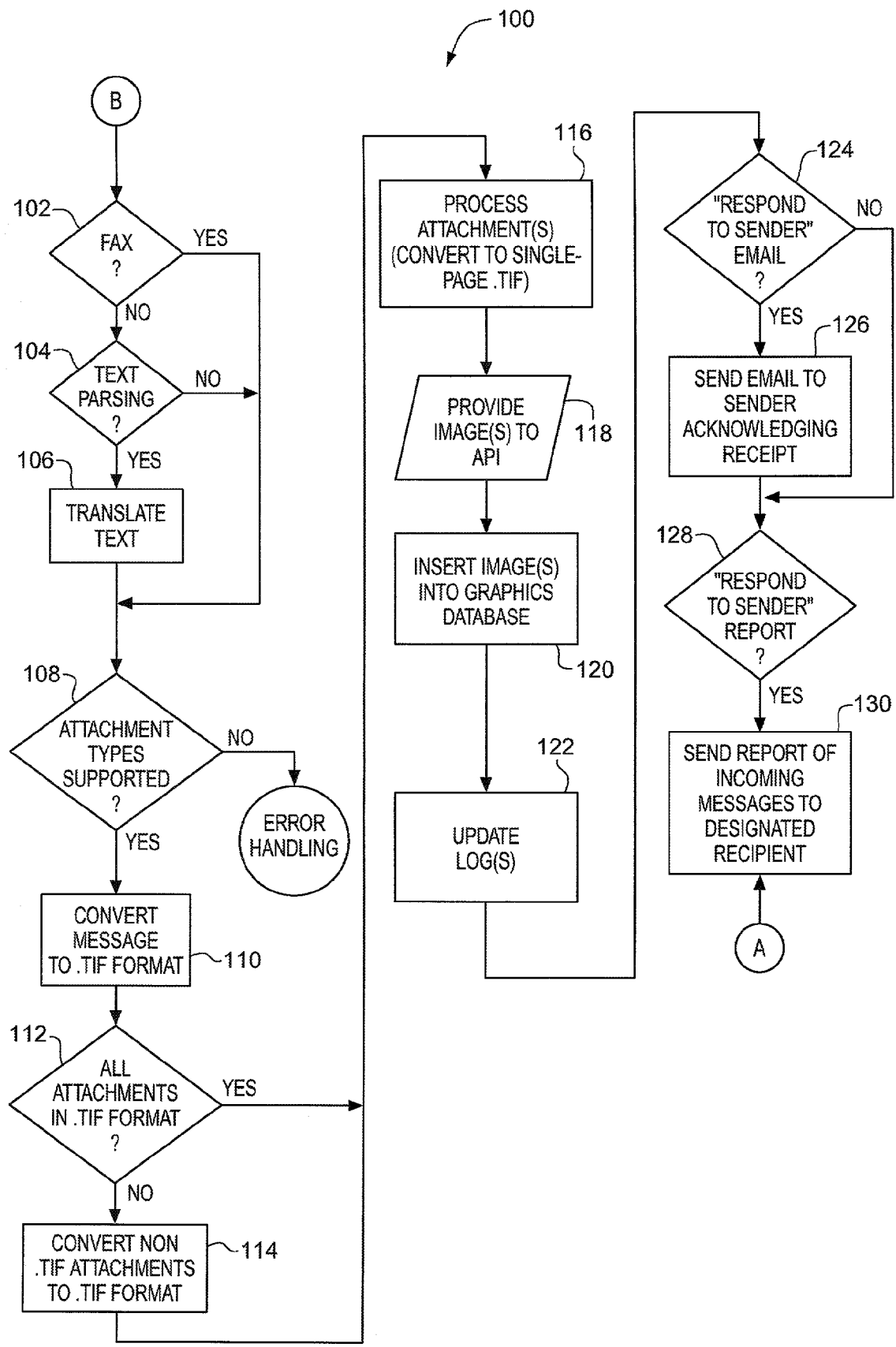
Figure 2B:
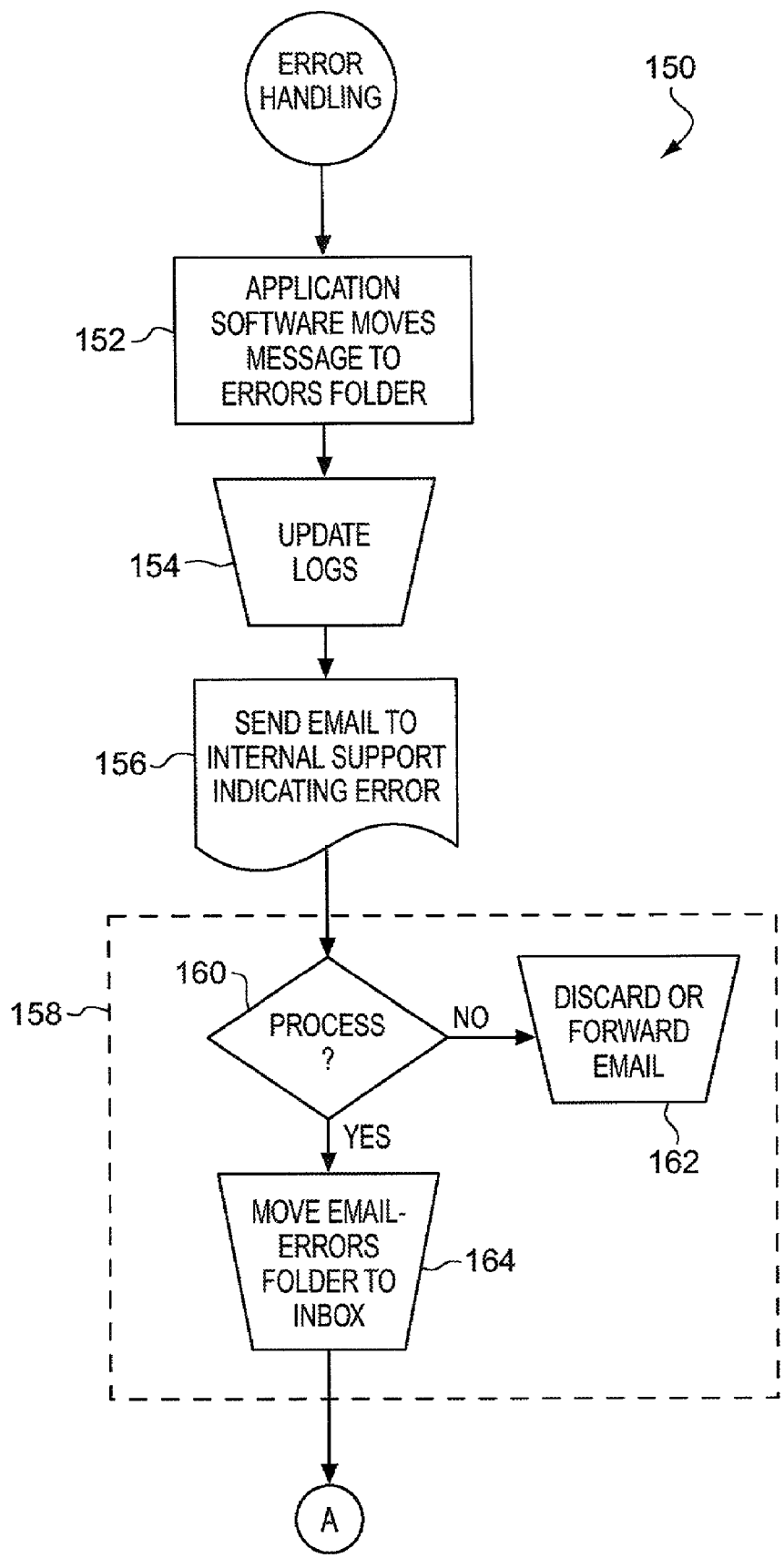
FIG. 2B shows a flowchart illustrating one error handling routine of the invention and used in conjunction with the flowcharts of FIG. 2 and FIG. 2A.

FIG. 2, FIG. 2A and FIG. 2B show connected flowcharts 50, 100, 150, respectively, to illustrate certain operational steps and automated processes of one embodiment of the invention. By way of example, flowcharts 50, 100, 150 may be used to program system 10 of FIG. 1 in order to process and manage email in accord with the teachings of the invention. In FIG. 2, flowchart 50 begins at step 52 by receiving an email at the email server, e.g., server 12, FIG.

1. At step 54, the appropriate email client is notified of the incoming email. For example, one of computers 18 may be the email client receiving the incoming email. Processing email with the application software begins at step 56; and continuance with flowchart 100, FIG. 2A, is indicated by terminal "A." The application software polls activated email inboxes at step 58. Optionally, a message class may be determined at step 60, such as whether the email contains a facsimile. Provided the message class is approved, step 62, processing continues at step 64; otherwise the error handling routine of FIG. 2B commences, as shown.

The email originator may be used to gate email through steps 64, 66, as shown. By way of example, the "From:" field of the email may be evaluated to determine the email originator. If all originating senders are authorized, step 64, processing continues at step 68. If only certain email originators are to be processed by the application software, step 66, the email may be compared to an authorization list (e.g., a list of organizations). If the sender is authorized, processing continues at step 68; if the sender is not authorized, the error handling routine of FIG. 2B commences, as shown.

Optionally, email content may be evaluated by the application software for illegal text strings, or not, via steps 70, 72. If this feature is activated "on," then the email is evaluated for illegal text strings at step 72. In the event of an error text string, the error handling routine of FIG. 2B commences, as shown. If there are no errors, processing continues at terminal "B" of flowchart 100, FIG. 2A, as shown.

FIG. 2A shows continued processing of the email through flowchart 100. At step 102, if the email contains a facsimile only, steps 104, 106 may be skipped. If the email contains information other than a facsimile, certain textual content may be electively parsed, step 106, and translated, step 106, to match desired or standardized text. For example, a corporate name within the email may be parsed and translated to an acronym indicating the corporation, if desired.

Email enclosures, or "attachments," if any, may be evaluated for type at step 108. If system 10 is not configured to accept the attachment type, the error handling routine of FIG. 2B commences, as shown; otherwise processing continues at step 110. In step 110, email content without attachments is converted to a graphic image such as a TIFF file. If the email attachments are already in graphic form (e.g., the each attachment is a TIFF file), step 112, then no conversion is needed and processing continues at step 116. If one or more attachments are not in graphic form, however, these attachments are converted to graphic form in step 114. A further conversion may occur at step 116 to convert all attachments to a single page graphic file, e.g., a TIFF file.

Graphic images of converted email content are then presented to the desired graphics database induction method (e.g. either the FileNET Panagon API or the FileNET HPII) at step 118. These images are then stored within the graphics database (e.g., the FileNET repository) at step 120.

Selected housekeeping steps 122-130 may then commence. For example, a log of the images stored in the graphics database is updated at step 122. A response email, if appropriate, may be sent to the email originator as shown by steps 124, 126. A report indicating the automated responses may also be generated at steps 128, 130, as shown.

FIG. 2B shows one error handling routine in a flowchart 150 of the invention. In the event of an error such as set forth in FIG. 2 and FIG. 2A, the application software moves the email to an Errors folder at step 152. A log identifying which messages were sent to the Errors folder may occur at step 154; and an email identifying the problem may issue at step 156. Processing within block 158 may be automatic or manual, as a matter of design choice. Whether email within the Errors folder are processed, or not, is gated at step 160. If email within the Errors folder is not processed, that email may be discarded or forwarded at step 162. If the email is to be processed, that email is processed for the appropriate inbox, step 164, such as described in connection with FIG. 2 and FIG. 2A.

Those skilled in the art should appreciate that flowcharts 50, 100, 150 of FIG. 2, FIG. 2A and FIG. 2B are illustrative and not limiting; changes, deletions and ordering of steps 52-72, steps 102-130, and steps 152-164 may occur as a matter of design choice and without departing from the scope of the invention.

Figure 3:
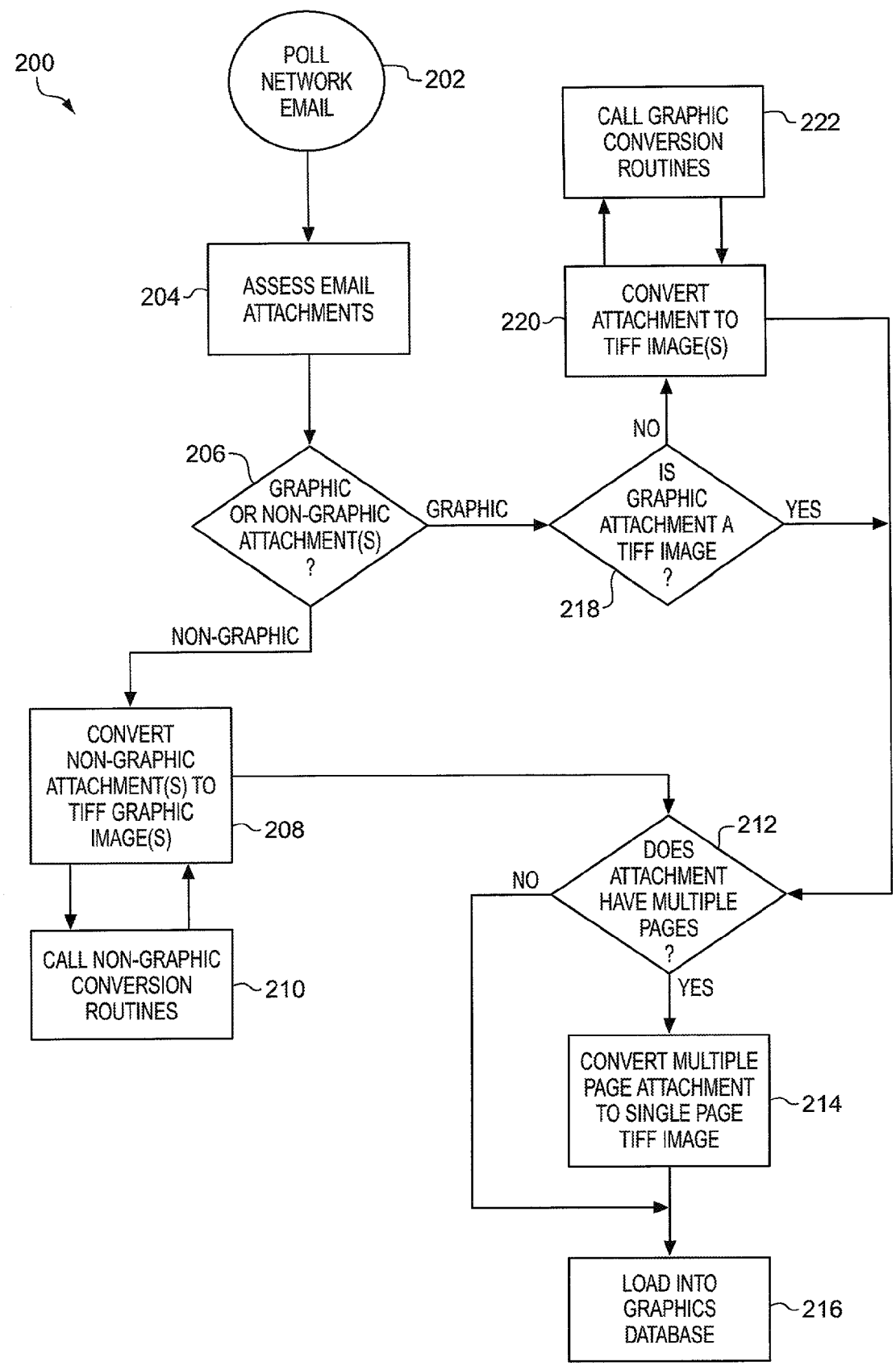
FIG. 3 illustrates process methodology for converting email attachments to graphic images in accord with one embodiment of the invention.

FIG. 3 shows a flowchart 200 illustrating methodology for converting email attachments to database graphic images according to one embodiment of the invention. An email server such as a MICROSOFT EXCHANGE® server is configured to poll incoming network email at step 202. At step 204, attachments of the email are evaluated for type. For example, step 204 may determine that the email attachments are one or more of a spreadsheet file (e.g., a .xls file), an electronic document (e.g. a .doc file), a rich text format electronic document, a .pdf file, a .bmp graphic file, a .jpg graphic file, or other attachment type. Step 206 illustratively shows a branch to further processing of graphic images or non-graphic files.

For one or more non-graphic attachments, method step 208 converts the non-graphic attachments to one or more graphic images. As needed or desired, one or more non-graphic conversion routines may be called at step 210. By way of example, if the attachment is a WORD PERFECT® document (i.e., an electronic file with a .wpd extension), one routine of step 210 may convert that file extension to a .doc file extension; another image conversion routine (e.g., TIFF.dll) of step 210 may convert a .doc file extension to one or more TIFF images; another routine of step 210 may convert rich text documents to one or more graphic images; yet another routine of step 210 may convert a spreadsheet document (e.g., a .xls file) to one or more graphic images; still another routine of step 210 may convert a postscript or .pdf file to one or more graphic images.

In the event the graphic images from steps 208, 210 have multiple pages, step 212, these multi-page graphic images are converted to a single page graphic image, e.g., a TIFF image, at step 214. A routine such as TIFF.dll, known in the art, may for example be utilized at step 214.

At step 216, single page graphic images are loaded into a graphics database (e.g., a FileNET repository) for future storage and use. These database images memorialize email content as of the date of receipt so that they may be recalled without corruption or modification at a future date. Preferably, step 216 also associates the graphic image with certain workflow tasks to trigger further workflow processes.

With further regard to FIG. 3, step 218 follows branch 206 when one or more attachments are graphic images, e.g., .bmp and .jpg files. A routine such as TIFF.dll may again be called at step 222 to facilitate conversion of non-TIFF files to TIFF images, at step 220. Multi-page TIFF images are again converted at steps 212, 214, as above, so that a single page TIFF may be loaded into the graphics database and associated with workflow at step 216. In one embodiment of step 216, for example, a FileNET API may be used to load the graphic image into a FileNET database. The FileNET database acknowledges by communicating a unique log file (see steps 118-122, FIG. 2A) used to subsequently locate and utilize the image in workflow processes.

Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

What is claimed is:

1. A method for managing email content using an email server, an email induction server and a graphics database, the email server, the email induction server and the graphics database are in communication through a network, the method comprising the steps of:
   receiving at the email server an email via the network;
   electronically monitoring the network email received at the email server for email content;
   automatically extracting the content of the network email using the email induction server including:
      analyzing the network email to determine whether the network email includes at least one enclosure,
      if the network email includes at least one enclosure, determining whether the at least one enclosure is in a non-graphics image format, and
      converting the content of the network email including the at least one enclosure having a non-graphics image format to a single page graphics image format;
   loading the content of the network email into the graphics database accessible from the network; and
   triggering tasks to be performed as part of a workflow process based on the content extracted from at least one of the network email and the at least one enclosure included with the network email, wherein triggering tasks includes prompting the user to perform a business task relating to the content of the email after storing the network email into the graphics database.

2. A method of claim 1, the step of automatically extracting the content comprising extracting attachments having a graphic image format from the email.

3. A method of claim 1, the step of automatically extracting the content comprising extracting electronic documents from the email.

4. A method of claim 1, the step of automatically extracting the content comprising extracting parsed text from the email.

5. A method of claim 1, the step of loading the content into a graphics database comprising loading the content of the network email into a data retrieval and storage repository.

6. A method of claim 1, the step of automatically extracting further comprising automatically extracting the content of the network email including graphic image attachments, documents and parsed text from the email; and the step of loading further comprising the step of associating the extracted content of the network email with business tasks, and automatically triggering tasks to be performed as part of a workflow process based on the content extracted from the network email.

7. A method of claim 1, the step of electronically monitoring comprising periodically polling one or more email inboxes for new messages, the periodic polling is performed using the email induction server.

8. A method of claim 7, the step of periodically polling comprising polling the email inboxes at about every ten seconds.

9. A method of claim 1, further comprising the step of automatically determining an organization associated with the network email, to authorize, or not authorize, the steps of electronically monitoring the network email, automatically extracting the content of the network email, and loading the content of the network email.

10. A method of claim 9, the step of automatically determining an organization comprising automatically comparing the organization with an authorization list.

11. A method of claim 10, further comprising forwarding the email to an electronic file for error handling in the event that the organization is not within the authorization list.

12. A method of claim 9, the step of automatically determining an organization comprising the step of interrogating a from-field of the email.

13. A method of claim 1, further comprising the step of automatically scanning the email for illegal text strings defined in a predetermined electronic file.

14. A method of claim 13, further comprising moving the message with one or more illegal text strings to an electronic file for error handling.

15. A method of claim 1, the step of automatically extracting the content comprising the step of converting the email, without enclosures, to a graphics image format.

16. A method of claim 15, the step of converting the email to a graphics image comprising converting the email to a TIFF image.

17. A method of claim 1, the step of automatically extracting the content comprising the step of interpreting enclosures of the email.

18. A method of claim 17, further comprising the step of converting the enclosures to one or more graphic images.

19. A method of claim 18, further comprising converting multiple graphic images to a single page graphic image.

20. A method of claim 19, the step of converting multiple graphic images to a single page graphic image comprising converting multiple graphic images to a TIFF image.

21. A method of claim 17, further comprising the step of converting each non-graphic image enclosures of the email to one or more graphic images.

22. A method of claim 21, further comprising the step of converting multiple graphic images to a single page graphic image.

23. A method of claim 21, the step of converting each of the non-graphic image enclosure comprising converting the non-graphic image enclosure to one or more TIFF images.

24. A method of claim 23, the step of converting to one or more TIFF images comprising converting multiple page TIFF images to a single page TIFF image.

25. A method of claim 21, the non-graphic image enclosures comprising one or more of spreadsheets, documents, rich text files, and postscript files.

26. A method of claim 17, further comprising converting .pdf files to one or more graphic images.

27. A method of claim 26, further comprising converting the one or more graphic images to a single page TIFF image.

28. A method of claim 17, further comprising converting graphic images to one or more TIFF images.

29. A method of claim 28, further comprising converting multi-page TIFF images to a single page TIFF image.

30. A method of claim 28, the graphic images comprising one or more of .pdf and .jpg files.

31. A method of claim 17, further comprising the step of converting each .wpd file to a .doc file.

32. A method of claim 31, further comprising converting each .doc file to one or more graphic images.

33. A method of claim 32, further comprising converting the images to a single page TIFF image.

34. A method of claim 1, further comprising the step of automatically formulating a overview file summarizing the content stored in the graphics database.

35. A system for managing email content of a network, comprising:

an email server configured to monitor incoming email of the network for content;

a graphics database for storing data files; and an email induction server connected in communication with the email server and the graphics database through the network, the email induction server configured to:

(a) automatically extract content from the email by:
analyzing the email to determine whether the email includes at least one enclosure, and
if the email includes at least one enclosure, determining whether the at least one enclosure is in a non-graphics image format, (b) convert the content of the email including the at least one enclosure having a non-graphics image to a single page graphics image, (c) load the content of the converted email to the graphics database accessible from the network; and (d) trigger tasks to be performed as part of a workflow process based on the content extracted from at least one of the email and the at least one enclosure included with the email, wherein the email induction server configured to prompt the user to perform a workflow activity relating to the content of the email after storing the network email into the graphics database.

36. A system of claim 35, the graphics database comprising a data retrieval and storage repository.

37. A system of claim 35, the email server communicating email between the induction server and the Internet, and one or more computers coupled to the database via the network, wherein incoming email from the Internet is available at the computers.

38. A system of claim 35, the email server configured to periodically poll email inboxes of the network for new email messages.

39. A system of claim 35, further comprising a management computer coupled to the database via the network, for managing the application software.

40. A system of claim 35, the graphics database comprising means for acknowledging receipt of loaded content, the receipt triggering automated workflow processes.

41. An email system for processing email for a network, the system comprising:

an email server configured to monitor incoming email of the network for content;

a graphics database for storing data files; and an email induction server connected in communication with the email server and the graphics database though the network, the email induction server including application software configured to:

analyze the email to determine whether the email includes at least one enclosure, if the email includes at least one enclosure, determine whether the at least one enclosure is in a non-graphics image format, extract content from the email, convert the content of the email including the at least one enclosure having a non-graphics image to a single page graphics image, load the content of the converted email to the graphics database accessible from the network, and trigger tasks to be performed as part of a workflow process based on the content extracted from at least one of the email and the at least one enclosure included with the email wherein the application software is configured to prompt the user to perform a workflow activity relating to the content of the email after storing the network email into the graphics database.

42. An email system of claim 41, the email induction server further configured to:

extract the content of the email including graphic image attachments, documents and parsed text from the email, associate the extracted content of the email with business tasks, and automatically trigger tasks to be performed as part of a workflow process based on the content extracted from the email.

43. A process for memorializing email content using an email sewer, an email induction server and a graphics database, wherein the email server, the email induction server and the graphics database are in communication though a network, the process comprising:

communicating email from a computer to the email server, wherein the email includes data describing an insurance claim submitted for processing;

automatically extracting the content of the email including the insurance claim data using the email induction server including:

analyzing the email to determine whether the email includes at least one enclosure, if the email includes at least one enclosure, determining whether the at least one enclosure is in a non-graphics image format, and converting content of the email including the at least one enclosure having a non-graphics image format to one or more single page graphic images for storage within the graphics database in response to receiving the email at the email server, automatically communicating acknowledgment to the email server that the content is graphically memorialized; and triggering insurance claim processing tasks to be performed to process the submitted insurance claim data based on the content extracted from at least one of the email and the at least one enclosure included with the email wherein triggering insurance claim processing tasks includes prompting the user to further process the insurance claim.

44. A process of claim 43, further comprising triggering workflow associated with the email in response to the acknowledgment.

45. A process of claim 44, the email comprising an insurance claim, the workflow comprising further processing of the insurance claim.

* * * * *